US010820200B2

United States Patent
Syed et al.

(10) Patent No.: US 10,820,200 B2
(45) Date of Patent: Oct. 27, 2020

(54) FRAMEWORK FOR SECURING DEVICE ACTIVATIONS

(71) Applicant: T-Mobile USA, Inc., Bellevue, WA (US)

(72) Inventors: Hamza Syed, Bothell, WA (US); Nilesh Ranjan, Sammamish, WA (US); Anjani Deepthi Nandigam, Redmond, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 31 days.

(21) Appl. No.: 16/247,280

(22) Filed: Jan. 14, 2019

(65) Prior Publication Data
US 2020/0228979 A1 Jul. 16, 2020

(51) Int. Cl.
*H04W 12/06* (2009.01)
*H04W 12/12* (2009.01)
*H04W 4/24* (2018.01)
*H04W 12/00* (2009.01)

(52) U.S. Cl.
CPC ............ *H04W 12/06* (2013.01); *H04W 4/24* (2013.01); *H04W 12/0023* (2019.01); *H04W 12/12* (2013.01)

(58) Field of Classification Search
CPC . H04W 12/06; H04W 12/0023; H04W 12/12; H04W 4/24
See application file for complete search history.

(56) References Cited

U.S. PATENT DOCUMENTS

| 9,760,886 B2* | 9/2017 | Wong | G06Q 20/363 |
| 2013/0067552 A1* | 3/2013 | Hawkes | H04W 12/06 |
| | | | 726/7 |
| 2013/0122862 A1* | 5/2013 | Horn | H04W 8/20 |
| | | | 455/411 |
| 2014/0189808 A1* | 7/2014 | Mahaffey | H04L 63/083 |
| | | | 726/4 |
| 2014/0189829 A1* | 7/2014 | McLachlan | H04L 63/08 |
| | | | 726/6 |
| 2016/0021532 A1* | 1/2016 | Schenk | H04B 1/3816 |
| | | | 455/558 |
| 2016/0315929 A1* | 10/2016 | Childress | H04W 12/06 |
| 2019/0260739 A1* | 8/2019 | Magli | H04L 9/0643 |
| 2019/0334884 A1* | 10/2019 | Ross | G06F 21/31 |

* cited by examiner

*Primary Examiner* — Min Jung
(74) *Attorney, Agent, or Firm* — Han Santos, PLLC (57) ABSTRACT

Techniques are described herein for authenticating a subscriber when activating user equipment and monitoring user equipment state. During the activation process, one or more using unique authentication questions can be presented to the subscriber in a customer validation screen. Individual subscribers can compose the authentication questions and corresponding answers during purchase such that the purchase order includes at least one device identifier corresponding to the user equipment associated with a purchase order. Upon authentication, one or more functionalities or features of the user equipment can be enabled. Additionally, billing and provisioning systems can be implemented as well as real-time or near real-time subscriber identity module (SIM) provisioning. The status of the user equipment can be transmitted to a telecommunications network provided by a telecommunications service provider on a scheduled basis in order to monitor the user equipment state and compliance.

20 Claims, 4 Drawing Sheets

FRAMEWORK FOR SECURING DEVICE ACTIVATIONS

BACKGROUND

The growth in demand for user equipment such as smartphones has underscored a need for providing anti-theft measures and security. Various anti-theft programs that implement remote device locking and disabling are used to deter stolen and lost devices from being used and to protect private data stored on those devices. However, these programs are generally implemented after a device's boot sequence or a setup sequence because these programs do not provide an interface for providing authentication on a device that is not in a subscriber's possession and that is not yet activated.

For instance, authentication credentials for enabling touch ID using fingerprints or facial recognition software are obtained during a device's boot sequence or a setup sequence upon possession because a subscriber needs direct physical access to the device to provide his or her own fingerprints or images of his or her face. In this way, authentication credentials are not created and tied to a specific device before the device is in a subscriber's possession. Thus, existing anti-theft programs are generally limited to deterring theft in only specific circumstances, and these programs do not provide measures to deter or prevent unactivated devices from being stolen or lost (e.g., during delivery or en route to a subscriber) and resold by unauthorized third party vendors.

In certain circumstances, a stolen or lost device can be activated and remote provisioning of a universal integrated circuit card (UICC) or subscriber identity module (SIM) card of the device can be implemented to enable the device to access and use communications services associated with a particular subscription from a telecommunications service provider. As a result, rightful owners or subscribers of user equipment are provided with little to no recourse to recover their user equipment that has not yet been activated. Additionally, stolen and lost devices can have other impacts that can result in a loss of revenue, customer base, and business reputation for original equipment manufacturers (OEMs) and wireless telecommunication carriers that provide user equipment.

BRIEF DESCRIPTION OF THE DRAWINGS

The detailed description is described with reference to the accompanying figures, in which the leftmost digit(s) of a reference number identifies the figure in which the reference number first appears. The use of the same reference numbers in different figures indicates similar or identical items.

DETAILED DESCRIPTION

This disclosure is directed to techniques for authenticating one or more subscribers of a user equipment by implementing an authentication layer via an authentication framework at a point of sale or point of purchase. The authentication framework includes a device activation application. The device activation application can be stored and executed on the user equipment itself. In various embodiments, the techniques described herein can be performed during an initial setup such as device activation or while the user equipment has booted up in recovery.

During a boot sequence or setup, the user equipment can authenticate a subscriber (or a person claiming to be the subscriber) via the device activation application. As part of the setup or activation process, the device activation application can obtain a set of unique authentication questions associated with the user equipment via an application programming interface (API), and the questions are presented to the subscriber (or a person claiming to be the subscriber) to enable the subscriber to provide answers to the questions. The subscriber, as part of the purchase process, can compose the authentication questions before the user equipment is delivered to the subscriber and activated for use. Accordingly, the authentication questions and corresponding answers are generated before the subscriber is in physical possession of the user equipment, whereby the authentication questions and the corresponding answers are unique to each subscriber and user equipment.

Upon obtaining answers for the authentication questions, the device activation application can authenticate the subscriber using various authentication protocols (e.g., PAP, CHAP, multifactor authentication (MFA) protocol, etc.). The device activation application can use the authenticated information to enable one or more functionalities of the user equipment. Conversely, if the authentication is not successful or the user authentication fails, the device activation application can use the unverified information to disable one or more functionalities of the user equipment. In various embodiments, the user equipment may operate in a limited capacity when one or more functionalities are disabled.

In various embodiments, the device activation application can transmit user equipment status to the network on a scheduled basis and/or in accordance with a notification scheme that can be preset by a subscriber, a telecommunications service provider, or a third party working with the telecommunications service provider. The user equipment status can be used to continuously monitor whether the user equipment is used in accordance with rules, policies, settings, and/or privileges corresponding to a particular subscription for communications services from a telecommunications service provider. In one example, the user equipment can be automatically disabled if the user account associated with the user equipment comprises an overdue balance or if there are other billing issues (e.g., unpaid user equipment). In another example, the user equipment can be locked if it is reported as lost or stolen. Disabled or locked user equipment can be registered in the EIR that is operatively connected to a core network of the telecommunications service provider.

The techniques described herein may be implemented in a number of ways. Example implementations are provided below with reference to the following figures.

Example Network Architecture

Figure 1:
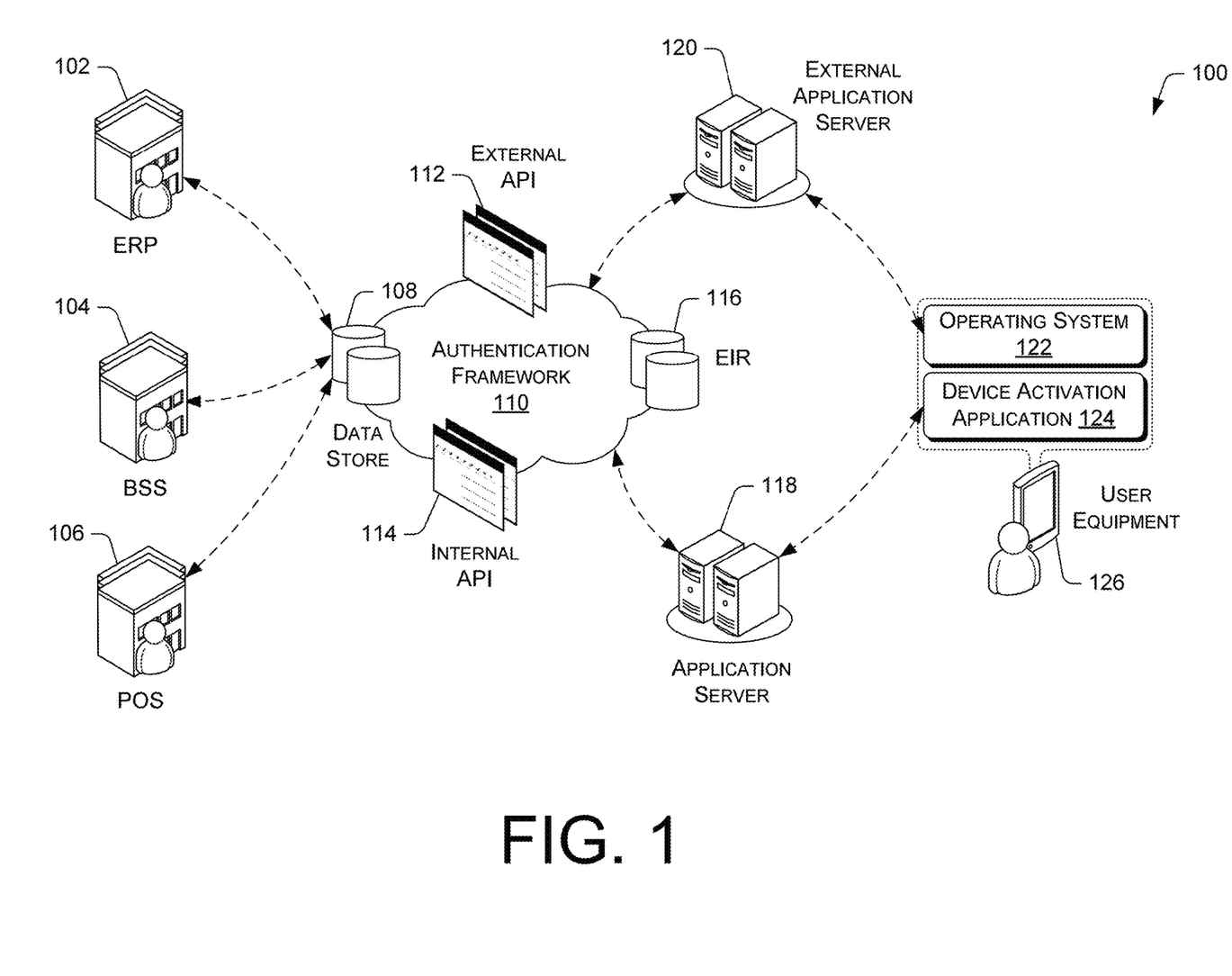
FIG. 1 illustrates example network architecture for implementing secure device activations to authorize one or more users of a user equipment.

FIG. 1 illustrates an example architecture 100 for providing an authentication framework to ensure authorized use of a user equipment 126. The architecture 100 may include one or more user equipment 126 such as smartphones, mobile devices, personal digital assistants (PDAs), special purpose-type devices, embedded-type devices, Internet of Things (IoT) devices, wearable-type devices, gaming devices, or entertainment devices such as network-enabled televisions, set-top boxes, media players, cameras, or other electronic devices having a wireless communication function that is capable of receiving inputs, processing the inputs, and generating output data.

In the illustrated embodiment, the user equipment 126 comprises a smartphone or a mobile device. The user equipment 126 can have at least one subscriber identity module (SIM) card or at least one universal integrated circuit card (UICC). In various embodiments, the SIM card or the UICC can be a removable physical smart card or an embedded card (i.e., eSIM, embedded UICC (eUICC)). The SIM card or the eUICC of the user equipment 126 can comprise an eUICC identity (EID), which may be used to refer to the user equipment 126. The user equipment 126 can also include other device identifiers such as a serial number, international mobile equipment identifier (IMEI), international mobile subscriber identity (IMSI), and/or so forth. These device identifiers can be physically printed on the eUICC or programmed and stored in the eUICC.

The eUICC contains one or more profiles. Profiles can include subscriber information associated with a network subscription provided by a telecommunications service provider. A profile can include a combination of a file structure, data, and applications associated with the service credentials provisioned onto the eUICC and which enable the user equipment 126 to use the subscription associated with that profile. Each profile stored on the eUICC is referred to as integrated circuit card identity (ICCID).

The user equipment 126 can include an operating system 122 or a platform that can be specific to the user equipment manufacturer (i.e., original equipment manufacturer (OEM)) and a device activation application 124. The user equipment 126 can be activated on a telecommunication network operated by a telecommunications service provider utilizing one or more wireless base stations or any other common wireless or wireline network access technology. The telecommunications network can be a cellular network that implements 2G, 3G, 4G, 5G, and long-term evolution (LTE), LTE advanced, high-speed data packet access (HSDPA), evolved high-speed packet access (HSPA+), universal mobile telecommunication system (UMTS), code-division multiple access (CDMA), global system for mobile communications (GSM), a local area network (LAN), a wide area network (WAN), IP Multimedia Core Network Subsystem (IMS), and/or a collection of networks.

The telecommunications network can include various network elements such as a mobile switching center (MSC), a gateway MSC (GMSC), a network switching subsystem (NSS), an authentication center (AuC), a home location register (HLR), a visitor location register (VLR), a service control point (SCP), a short message service center (SMSC), and other such elements that can form a core network. These network elements may include general-purpose computers, such as desktop computers, tablet computers, laptop computers, or other physical or virtual machines that are capable of receiving inputs, processing the inputs, and generating output data.

Additionally, the telecommunications network can include an authentication framework 110 for authenticating users of user equipment 126. The authentication framework 110 can include a data store 108. The data store 108 can comprise a database having a network record for the user equipment 126, user account related information, device-related information, and/or so forth. Without limitation, user account related information can include the user account identifier, user equipment associated with the user account identifier, telephone numbers corresponding to the user equipment, billing information associated with the user account identifier, a plurality of rules, policies, settings, privileges, credentials related to each of the subscribers and/or user equipment associated with the user account identifier, and/or so forth. Without limitation, device-related information can include device identifiers such as serial number, IMEI, IMSI, ICCID, mobile equipment identifier (MEID), mobile subscription information number (MSIN), mobile subscriber integrated services digital network number (MSISDN), etc. corresponding to a user equipment. In various embodiments, the data store 108 can comprise a home subscriber server (HSS), HLR, and/or so forth. The data store 108 can also comprise an equipment identity register (EIR) 116. The EIR 116 can maintain a record of all user equipment and corresponding device identifiers that are allowed in the network as well as user equipment that are banned. In one example, the user equipment can be banned if one or more predetermined conditions are satisfied. The predetermined conditions can include when the user equipment 126 is reported as lost or stolen, and/or if the user equipment 126 is associated with an account that is suspended.

The authentication framework 110 can further include one or more servers such as an application server 118 for providing an internal application programming interface (API) 114 that can be used to interface with the device activation application 124 on the user equipment 126. Similarly, the authentication framework 110 can also include at least one external or third party application server 120 for providing an external API 112 that can be used to interface with the operating system 122 of the user equipment 126. The external or third party application server 120 can be operated and/or managed by an OEM, depending upon embodiments. The external API 112 can be a part of the operating system 122.

The device activation application 124 can provide an authentication layer that is configured to present unique authentication questions to a subscriber during a boot sequence or setup of the user equipment 126. The subscriber can compose authentication questions that can be associated with the user equipment 126 corresponding to a device identifier such as IMEI at the time of purchase of the user equipment 126. Thus, the authentication questions are unique to the subscriber as well as the user equipment 126. In this way, the subscriber's authentication questions are not presented to other user equipment having different corresponding device identifiers. The purchase of the user equipment 126 can occur at the point of sale (POS) 106, or the place at which the user equipment 126 is retailed or where a retail transaction is completed. The POS 106 can be a brick and mortar store or an online e-commerce store such that the user equipment 126 can be purchased online, over the phone, or in a store and delivered to the subscriber. The POS 106 can be operated and/or managed by an OEM, a telecommunications service provider, and/or an authorized third party vendor.

The purchase order can include account related information such as the subscriber (i.e., the purchaser) related information, billing information, shipping information, account related information, user equipment related information, authentication questions, and/or so forth. In one example, a subscriber can compose authentication questions as part of the ordering process. More particularly, if the user equipment 126 is purchased online through a website of a telecommunications service provider, the website can provide a graphical user interface (GUI) that enables a subscriber to type in authentication questions and corresponding answers that can be hashed to protect actual data (i.e., answers). In this regard, the website can include a free-form data entry such that the GUI can provide a text box in an order form.

Additionally or alternatively, a subscriber can select one or more authentication questions from a list of pre-formulated authentication questions and provide corresponding answers to the selected questions. The questions can comprise various question types such as closed-ended questions (e.g., multiple choice questions, ordering questions, true/false questions, etc.) or open-ended questions (e.g., short answer questions, fill-in-the-blank questions, etc.). In the latter case, the questions may not have a single correct answer but multiple answers that could be correct differing among each other in their accurateness or specificity. Thus, an answer can be evaluated to determine a degree of correctness and/or a degree of accuracy. If the determined degree of accuracy and/or the degree of correctness is within a predetermined range, the answer may be accepted. In various embodiments, the authentication questions and corresponding answers can be locked upon submission of the purchase order. Additionally, or alternatively, the authentication questions and corresponding answers can be changed within a predetermined period of time after the submission of the purchase order. Authentication credentials (e.g., authentication questions and answers) can be stored and managed in the data store 108 and/or one or more servers such as the application server 118.

Generally, purchase order information, account related information, and/or user equipment related information can be stored and managed in one or more business support tools that can include databases. For example, the architecture 100 can comprise large database systems or business management tools, such as enterprise resource planning (ERP) system 102, that include database objects that store and organize various data, as well as database objects for accessing the data that can be spread across relational database tables. The ERP system 102 can be customized with code objects, executables, resources, and libraries, which may be developed and updated on an installation-specific basis to perform various functions such as product planning, cost tracking and development, manufacturing, service delivery, marketing, sales, inventory management, shipping and payment tracking. One example of an ERP system 102 is the Systems, Applications, and Products (SAP) system. In various embodiments, other systems can include a business support system (BSS) 104, which is configured to support customer-facing activities such as billing order management, customer relationship management (CRM), call center automation, and/or so forth. In various embodiments, the ERP system 102 and/or the BSS 104 can interface with the authentication framework 110 and/or the user equipment via the device activation application 124.

During a boot sequence or setup, the device activation application 124 can provide customer validation screens to provide one or more authentication questions and to enable the subscriber to answer authentication questions. The authentication questions can request information that comprises customer sensitive data (e.g., billing address, personally identifiable information (PII), sensitive personal information (SPI), etc.) that only a valid user equipment owner or a subscriber can provide. Upon receiving answers from the subscriber, the received answers to the authentication questions are evaluated for correctness and/or accuracy and/or validated against the network record and other data specific to the user equipment 126. If the subscriber cannot provide correct answers to the authentication questions after a predetermined number of attempts or if credentials cannot be verified, the authentication fails and the subscriber can be locked out of the user equipment 126. Optionally, the subscriber can be manually authenticated using a customer care tool or by contacting a customer care service that can be operated by a telecommunications service provider, an OEM, or a third party entity working with the telecommunications service provider or the OEM.

In various embodiments, the device activation application 124 can confirm with the telecommunications service provider whether the subscriber has a valid account. If the subscriber does not have a valid account, the device activation application 124 can direct the subscriber to create an account. If the subscriber has an existing account, but the account is not active or suspended, the device activation application 124 can direct the subscriber to contact the customer care service. If the subscriber has a valid account and the answers to the authentication questions are validated against the network record, the subscriber is authenticated. Upon authenticating a subscriber, one or more functionalities of the user equipment 126 can be enabled for use. Additionally, the user equipment 126 can be registered on the telecommunications service provider's mobile communication network. In one example, the ICCID that identifies the eUICC and the IMSI that designates the subscriber can be used to provision the subscriber in the telecommunications service provider's billing system. In various embodiments, a new profile can also be remotely released for installation on the user equipment 126 upon activation of the user equipment 126. If the subscriber is an existing subscriber to the telecommunications service provider, the subscriber's service can be transferred to the new profile when the new profile is installed on the user equipment 126.

The device activation application 124 can also transmit real-time or near real-time status of the user equipment 126 to the telecommunications network on a scheduled basis or in accordance with a notification scheme. Additionally, or alternatively, the telecommunications service provider of the telecommunications network can query the user equipment 126 for status updates on a scheduled basis. The status updates can comprise identifiers such as ICCID of the eUICC of the user equipment and/or account identifiers. The status update can indicate whether or not the user equipment 126 is successfully activated and connected to the telecommunications network as well as whether or not the user equipment 126 is misplaced, lost, stolen, decommissioned, and/or so forth. Additionally, the status update can include whether or not the user account associated with the user equipment is delinquent and/or the user equipment is being used in accordance with a particular set of rules, policies, settings, and/or privileges. If the status of the user equipment 126 satisfies one or more conditions of a first set of conditions, the user equipment 126 can be registered as blacklisted in the EIR 116. For example, one or more conditions are satisfied if the user equipment 126 is reported as misplaced, lost, or stolen. In another example one or more conditions are satisfied if a user account associated with the user equipment 126 is delinquent. If the status of the user equipment 126 satisfies one or more conditions of a second set of conditions, the user equipment 126 can be registered as whitelisted in the EIR 116. For example, one or more conditions are satisfied if the user account associated with the user equipment 126 becomes current. In various embodiments, the external application server 120 can also transmit status updates to the network upon receiving communications from the user equipment 126.

Example Computing Device Components

Figure 2:
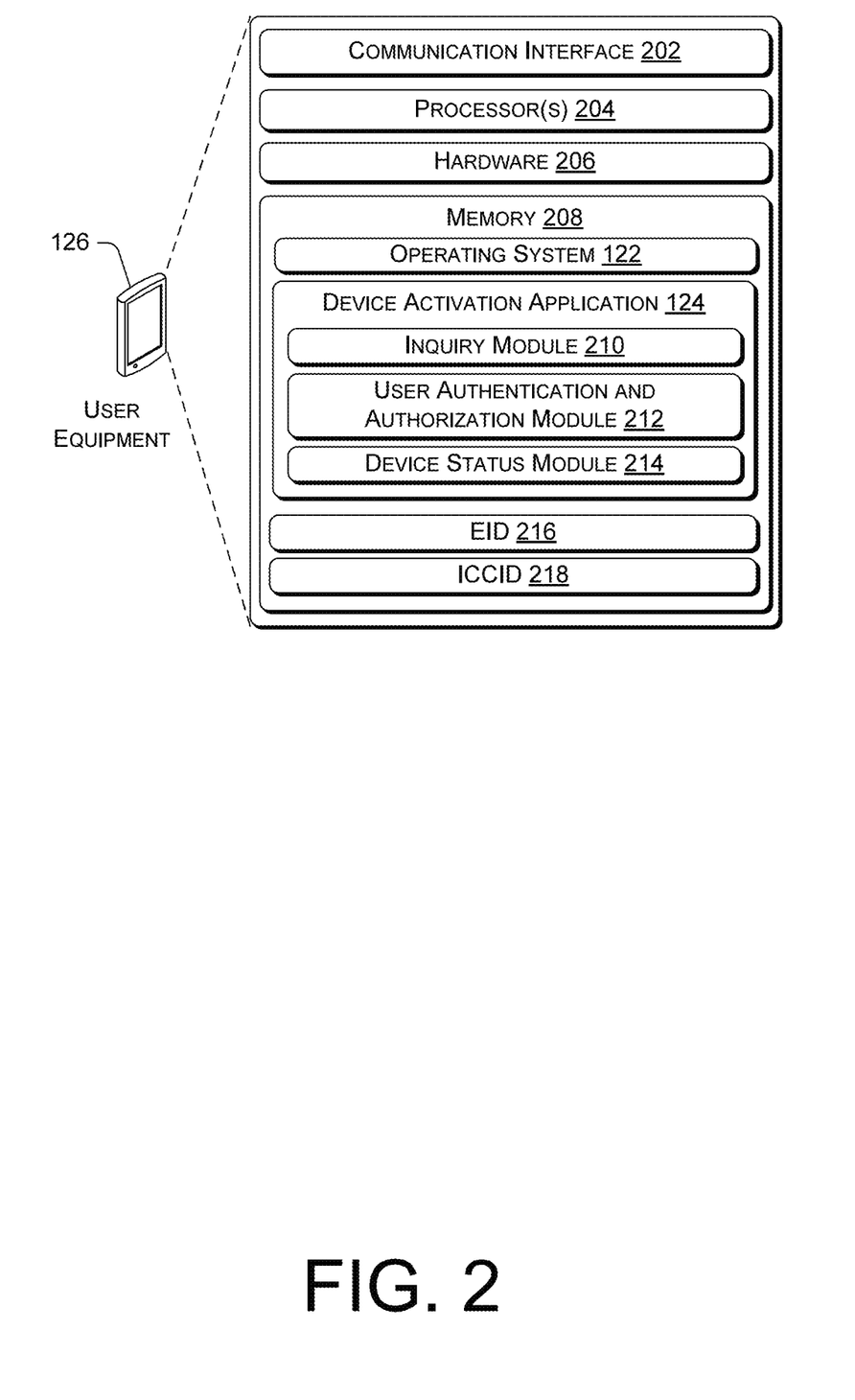
FIG. 2 is a block diagram showing various components of an illustrative computing device that implements the secure device activations.

FIG. 2 is a block diagram showing various components of an illustrative computing device, wherein the computing device can comprise a user equipment 126. It is noted that the user equipment 126 as described herein can operate with more or fewer of the components shown herein. Additionally, the user equipment 126 as shown herein or portions thereof can serve as a representation of one or more of the computing devices of the present system.

The user equipment 126 may include a communication interface 202, one or more processors 204, hardware 206, and memory 208. The communication interface 202 may include wireless and/or wired communication components such as a modem and a SIM card (e.g., eSIM or eUICC) that enable the user equipment 126 to transmit data to and receive data from other networked devices. In at least one example, the one or more processor(s) 204 may be a central processing unit(s) (CPU), graphics processing unit(s) (GPU), both a CPU and GPU, or any other sort of processing unit(s) and/or controlling unit(s). Each of the one or more processor(s) 204 may have numerous arithmetic logic units (ALUs) that perform arithmetic and logical operations as well as one or more control units (CUs) that extract instructions and stored content from processor cache memory, and then execute these instructions by calling on the ALUs, as necessary during program execution. The one or more processor(s) 204 may also be responsible for executing all computer applications stored in the memory, which can be associated with common types of volatile (RAM) and/or nonvolatile (ROM) memory.

The user equipment 126 further comprises various hardware 206 for ensuring the integrity and security of personal data and enabling communications with telecommunications service providers. The hardware 206 may include additional user interface, data communication, or data storage hardware. Thus, the hardware 206 can include the communication interface 202 and the memory 208. The user interfaces may include a data output device (e.g., visual display, audio speakers), and one or more data input devices. The data input devices may include but are not limited to, combinations of one or more of keypads, keyboards, mouse devices, touch screens or display screens that accept gestures, microphones, voice or speech recognition devices, cameras, and any other suitable devices.

The memory 208 may be implemented using computer-readable media, such as computer storage media. Computer-readable media includes, at least, two types of computer-readable media, namely computer storage media and communications media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In various embodiments, computer storage media can comprise secure persistent storage that can be a reserved partition in the nonvolatile storage of the user equipment 126. In contrast, communication media may embody computer-readable instructions, data structures, program modules, or other data in a modulated data signal, such as a carrier wave, or other transmission mechanisms.

The memory 208 may also include a firewall. In some embodiments, the firewall may be implemented as hardware 206 in the user equipment 126.

The processors 204 and the memory 208 of the user equipment 126 may implement an operating system 122 and a device activation application 124. The operating system 122 and the device activation application 124 may reside, completely or at least partially, within the memory 208 and/or within the processor 204 during execution thereof by the user equipment 126. The operating system 122 may include components that enable the user equipment 126 to receive and transmit data via various interfaces (e.g., user controls, a communication interface, and/or memory input/output devices), as well as process data using the processors 204 to generate output. The operating system 122 may include a presentation component that presents the output (e.g., display the data on an electronic display, store the data in memory, transmit the data to another electronic device, etc.). Additionally, the operating system 122 may include other components that perform various additional functions generally associated with an operating system.

The device activation application 124 can include an inquiry module 210, a user authentication and authorization module 212, and a device status module 214. During the user equipment's 126 boot sequence or setup sequence, the inquiry module 210 is configured to provide a customer validation screen to present one or more authentication questions to a subscriber. In this regard, the inquiry module 210 can request authentication questions from an application server in communication with the network. The request can include a user account identifier associated with the user equipment 126 and the subscriber. Additionally, the request can include one or more device identifiers corresponding to the user equipment 126. In various embodiments, the inquiry module 210 can also verify whether or not the subscriber has a valid account. If the subscriber has a valid account and the account is associated with a plurality of subscribers, the inquiry module 210 may prompt the subscriber to select a user profile corresponding to the subscriber in order to request the authentication questions composed by that subscriber and that are unique to that subscriber's user profile.

Upon receiving an answer for each of the authentication questions, the inquiry module 210 can provide the answers to the user authentication and authorization module 212. The user authentication and authorization module 212 is configured to verify the credentials. The user authentication and authorization module 212 can evaluate the answers and/or determine whether the answers match the network record. In this regard, the authentication and authorization module 212 is configured to establish a connection to a data store or a remote authentication and authorization authority (e.g., the application server) that contains authentication credentials.

Credentials for authenticating may include both data and instructions. For instance, the authentication credentials can include one or more user equipment identifiers such as EID 216 and ICCID 218 that uniquely identify the eUICC of the user equipment 126. In various embodiments, credentials can include stored hash digest of authentication questions and corresponding answers corresponding to one or more user equipment identifiers of the user equipment associated with a user account. The credentials can be associated with a subscription for communications services from a telecommunications service provider. Multiple sets of credentials can be provided for multiple subscriptions, depending upon embodiments.

Upon determining that the answers are correct and/or the answers match the network record, the user authentication and authorization module 212 enables one or more functionalities of the user equipment 126. Additionally, the device status module 214 transmits the status updates of the user equipment 126 to the network. The status updates can be transmitted on a scheduled basis. The status update can comprise one or more identifiers that correspond to the user equipment 126 associated with an account that correlates with an account identifier. Additionally, or alternatively, the telecommunications service provider of the network can query the user equipment 126 for status updates on a scheduled basis. The status updates can help monitor whether the user equipment 126 is activated and connected to the network to utilize communications services associated with a particular subscription from the telecommunications service provider.

Example Processes

Figure 3:
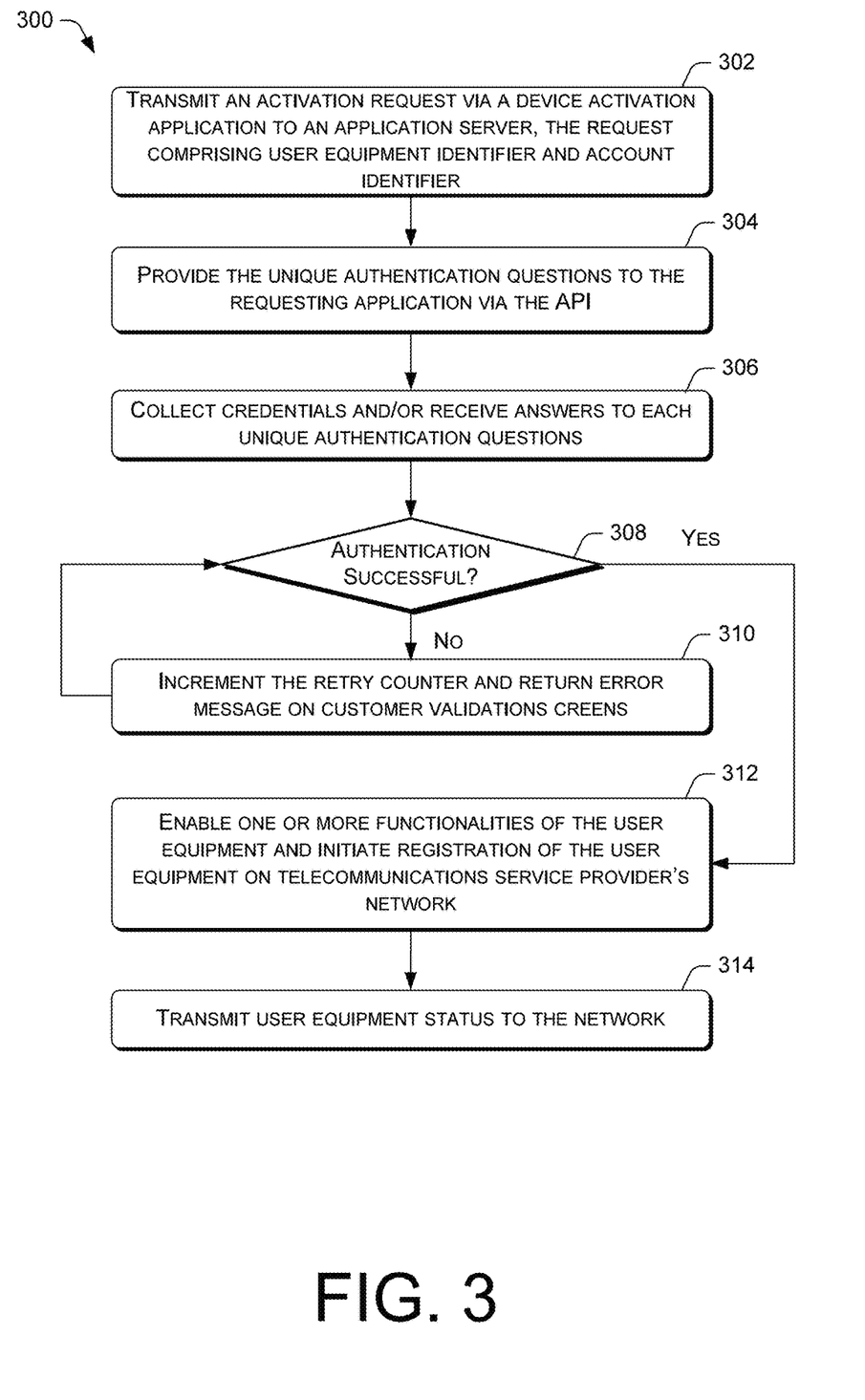
FIG. 3 is a flow diagram of an example process for conducting secure device activations.
Figure 4:
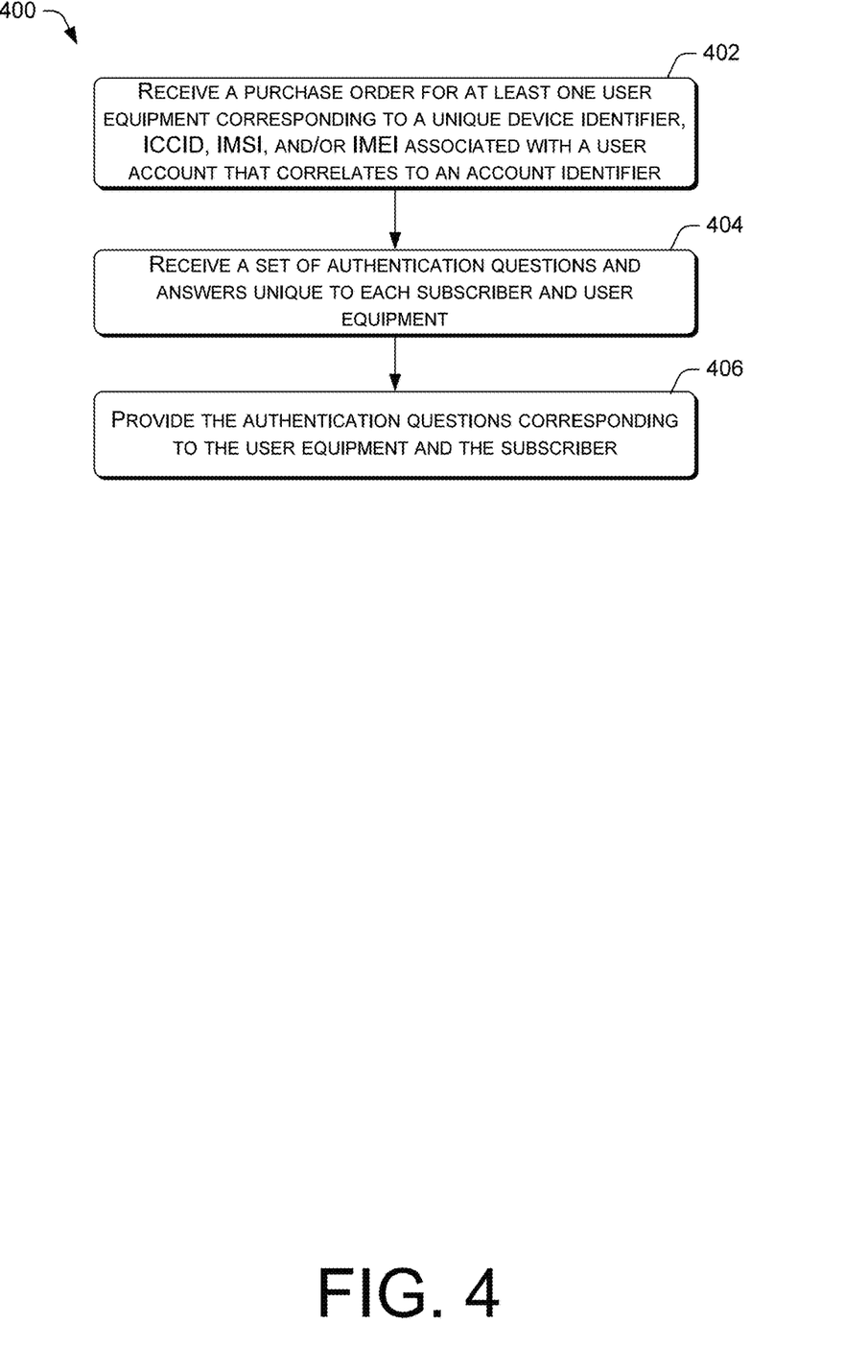
FIG. 4 is a flow diagram of an example process for providing question-based user authentication.

FIGS. 3-4 present illustrative processes 300-400 for conducting the device-based authentication. The processes 300-400 are illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 300-400 are described with reference to the architecture 100 of FIG. 1.

Referring now to FIG. 3, there is shown a flow diagram of an example process for conducting secure device activations. At block 302, a user equipment can transmit an activation request for authentication questions via a device activation application to an application server during a boot sequence or a setup sequence. The request can include one or more device identifiers corresponding to the user equipment and an account identifier corresponding to a user account associated with the user equipment and a subscriber. The user account can include a subscription for communication services that may be utilized by the user equipment upon user authentication.

At block 304, the application server can provide authentication questions corresponding to the user equipment and the subscriber to the requesting application via an application programming interface (API). In various embodiments, the authentication questions can be presented in a specific order. For instance, the one or more questions can be presented based on answers to previous questions. Additionally, or alternatively, the questions can be presented in a random order. In various embodiments, the questions can be timed to set a time limit to answer each question. If a question is not answered within the time limit, user authentication can fail. At block 306, the device activation application receives answers to each unique authentication question. More particularly, credentials can be collected through user input via the customer validation screens or programmatically via the API to be presented to the application server.

At decision block 308, the device activation application can evaluate the answers for correctness and/or accuracy to determine whether authentication is successful. In various embodiments, the answers to the authentication questions can be validated against the network record. If the answers are correct, the authentication is successful ("yes" response from the decision block 308) and the device activation application enables one or more functionalities of the user equipment and initiates registration of the user equipment on telecommunications service provider's network as indicated in block 312. In various embodiments, the authentication is successful only if all of the authentication questions are answered correctly. The number of authentication questions presented can vary from a subscriber to a subscriber. In various embodiments, the device activation application can be configured to set a minimum and a maximum number of authentication questions that can be presented.

If the authentication is not successful ("no" response from the decision block 308), the device activation application can increment the retry counter and present an error message on the customer validation screens as indicated in block 310. In various embodiments, the subscriber can make a predetermined number of attempts to answer an authentication question before the authentication fails. If the authentication fails, the user equipment can be automatically locked or disabled. At block 314, the device activation application can transmit user equipment status to the network on a scheduled basis to monitor the usage of the user equipment and ensure that the usage complies with applicable rules, policies, privileges, and/or so forth.

Referring now to FIG. 4, there is shown a flow diagram of an example process for providing question-based user authentication. At block 402, an application server can receive a purchase order from a point of sale or point of purchase system for at least one user equipment corresponding to a unique device identifier. The unique device identifier can include ICCID, IMSI, IMEI, and/or so forth. Additionally, the user equipment can be associated with a user account that correlates to an account identifier for at least one subscriber.

At block 404, the application server receives a set of authentication questions and answers unique to each subscriber and user equipment. In one example, it is assumed that there is one primary subscriber (i.e., the purchaser of the user equipment) using the user equipment. Accordingly, the authentication questions correspond to the single, primary subscriber and the user equipment. In another example, a plurality of subscribers associated with one user account can use the same user equipment. In this regard, each of a plurality of subscribers associated with the user account can compose authentication questions during the ordering process. For instance, each subscriber can comprise a user profile, and the user profile can correspond the subscriber's authentication questions and answers. At block 406, the application server, via the API can provide the authentication questions corresponding to the user equipment and the subscriber. If there is more than one subscriber, a subscriber can select his or her user profile and the authentication questions corresponding to the selected user profile can be presented to the subscriber and credentials corresponding to the selected user profile are collected during the authentication process.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:
   obtaining, from an application server, an authentication question associated with a user equipment and a purchase order for the user equipment, the authentication question corresponding to a unique device identifier and an account identifier correlating with an account that is associated with the user equipment, wherein the authentication question is preformulated by a subscriber when the purchase order is submitted;
   presenting the authentication question via a user interface of the user equipment;
   receiving credentials comprising an answer to the authentication question via the user interface of the user equipment;
   validating the credentials against a network record at the application server; and
   upon validating the credentials, enabling one or more functionalities of the user equipment and activating subscription services associated with the account.

2. The one or more non-transitory computer-readable media of claim 1, wherein the unique device identifier comprises an international mobile equipment identifier (IMEI) of the user equipment.

3. The one or more non-transitory computer-readable media of claim 1, wherein the acts further comprise:
   presenting an additional authentication question via the user interface of the user equipment;
   receiving additional credentials comprising an additional answer to the additional authentication question via the user interface of the user equipment;
   validating the additional credentials against the network record at the application server; and
   upon invalidating the additional credentials, disabling the one or more functionalities of the user equipment and registering the user equipment in an equipment identity register (EIR) of a communication network.

4. The one or more non-transitory computer-readable media of claim 3, wherein the authentication question and the additional authentication question are presented in a random order.

5. The one or more non-transitory computer-readable media of claim 1, wherein the authentication question corresponds to a user profile of the subscriber associated with the account.

6. The one or more non-transitory computer-readable media of claim 1, wherein the answer is hashed.

7. The one or more non-transitory computer-readable media of claim 1, wherein the acts further comprise:
   presenting an additional authentication question via the user interface of the user equipment, wherein the additional authentication question is associated with a time limit;
   receiving additional credentials comprising an additional answer to the additional authentication question via the user interface of the user equipment; and
   if the additional credentials are not received within the time limit, disabling the one or more functionalities of the user equipment and registering the user equipment in an equipment identity register (EIR).

8. A computer-implemented method, the method comprising:
   receiving, from an application server, at least one authentication question associated with a user equipment, wherein the at least one authentication question is preformulated by at least one subscriber during a purchasing process of the user equipment;
   presenting the at least one authentication question at the user equipment;
   receiving an answer for the at least one authentication question at the user equipment;
   validating the answer against a network record at the application server; and
   upon validating the answer, enabling one or more functionalities of the user equipment.

9. The method of claim 8, further comprising the steps of:
   continuously transmitting real-time or near real-time status of the user equipment to a network entity, wherein the network entity is configured to determine whether the status of the user equipment complies with one or more policies corresponding to a particular subscription for communications services from a telecommunications service provider in response to receiving the status.

10. The method of claim 8, wherein the at least one authentication question comprises a multifactor authentication request.

11. The method of claim 8, wherein the at least one authentication question is an open-ended question or a closed-ended question.

12. The method of claim 8, further comprising the steps of:
   presenting an additional authentication question at the user equipment;
   receiving an additional answer to the additional authentication question at the user equipment;
   upon invalidating the answer, increasing a retry counter; and
   if the retry counter exceeds a predetermined number of attempts, disabling the one or more functionalities of the user equipment.

13. The method of claim 8, wherein the at least one subscriber comprises a first subscriber and a second subscriber, the first subscriber associated with a first user profile and the second subscriber associated with a second user profile.

14. The method of claim 13, wherein the at least one authentication question comprises a first authentication question and a second authentication question, the first authentication question corresponding to the first user profile and the second authentication question corresponding to the second user profile.

15. The method of claim 14, further comprising the steps of:
   receiving a profile selection, the profile selection comprising the first user profile or the second user profile;
   if the profile selection comprises the first user profile, presenting the first authentication question in response to the profile selection; and
   if the profile selection comprises the second user profile, presenting the second authentication question in response to the profile selection.

16. A system, comprising:
   one or more non-transitory storage mediums configured to provide stored computer-readable instructions, the one or more non-transitory storage mediums coupled to one or more processors, the one or more processors configured to execute the computer-readable instructions to cause the one or more processors to:
   obtain, from an application server, an authentication question associated with a user equipment and a purchase order for the user equipment, the authentication question corresponding to a unique device identifier and an account identifier correlating with an account that is associated with the user equipment, wherein the authentication question is preformulated by a subscriber when the purchase order is submitted;

present the authentication question via a user interface of the user equipment;

receive credentials comprising an answer to the authentication question via the user interface of the user equipment;

validate the credentials against a network record at the application server;

upon validating the credentials, enable one or more functionalities of the user equipment and activate subscription services associated with the account; and transmit a device status of the user equipment to an external application server, wherein the external application server is configured to determine whether the device status of the user equipment complies with one or more policies corresponding to the subscription services based at least on the device status.

17. The system of claim 16, wherein the one or processors are further configured to:

disable one or more functionalities of the user equipment based at least on one or more communications from the external application server.

18. The system of claim 17, wherein the one or more processors are further configured to:

restore the one or more functionalities of the user equipment based at least on additional communications from the external application server.

19. The system of claim 16, wherein the one or processors are further configured to:

transmit the device status to an equipment identity register (EIR) of a communication network, wherein the EIR and the external application server are different.

20. The system of claim 16, wherein the one or more processors are further configured to:

receive a profile selection for a profile associated with the subscriber, wherein the authentication question is presented based at least on the profile selection.

* * * * *